C. O. CHROMASTER.
SANITARY CONTAINER.
APPLICATION FILED MAY 19, 1916.
1,337,195.
Patented Apr. 20, 1920.
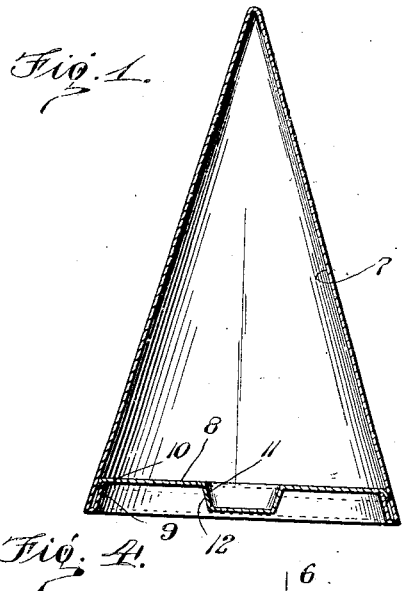
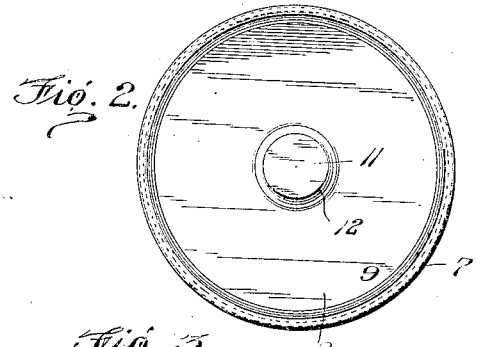
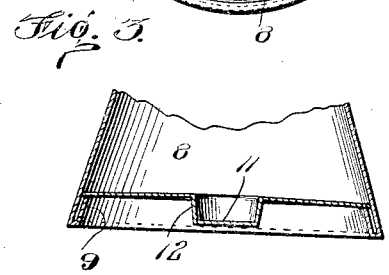
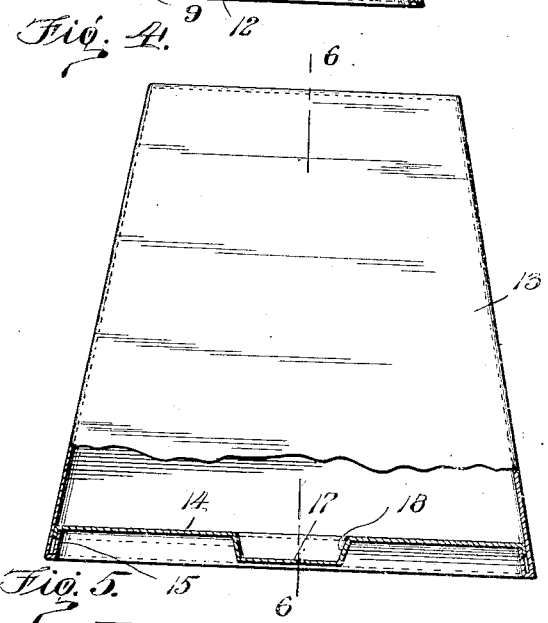
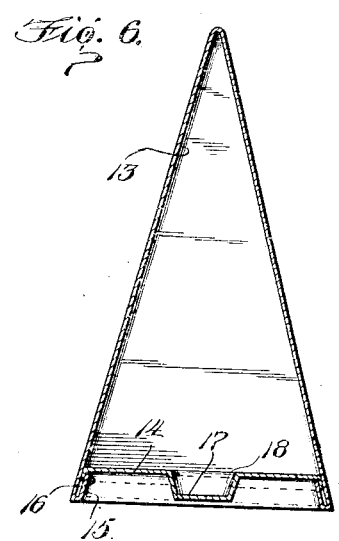
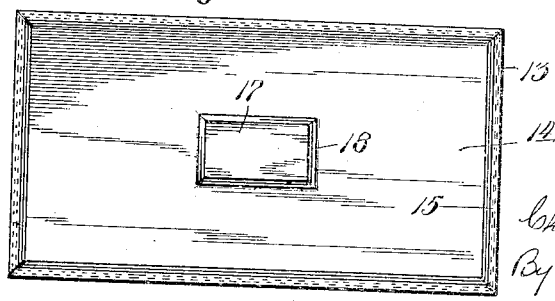
Inventor:
Charles O. Chromaster.
By Morsell, Keeney & French
Attorneys.

UNITED STATES PATENT OFFICE.

CHARLES O. CHROMASTER, OF MILWAUKEE, WISCONSIN.

SANITARY CONTAINER.

1,337,195.     Specification of Letters Patent.     Patented Apr. 20, 1920.

Application filed May 19, 1916. Serial No. 98,514.

*To all whom it may concern:*

Be it known that I, CHARLES O. CHROMASTER, a citizen of the United States, and resident of Milwaukee, in the county of Milwaukee and State of Wisconsin, have invented new and useful Improvements in Sanitary Containers, of which the following is a description, reference being had to the acompanying drawings, which are a part of this specification.

The invention relates to sanitary containers.

The invention is more particularly designed for use as a container for canned goods or liquid, such as milk.

It is common practice to provide bottles, jars or cans for food or liquids which are adapted to rest on either end and from which the contents may be emptied by opening up one end of the container. In devices of this kind it frequently happens that after a can has been opened and only a portion of the contents removed that the remainder is left in the can and in case the cans are made of tin the contents therein will become contaminated and unfit for wholesome use. The same is true where the containers are made of paper. To prevent reuse of the container after some of the contents have been removed therefrom is one of the essential objects of this invention and I preferably accomplish this by so shaping the container as to prevent its holding its contents except when resting on the side carrying a closure and so that on the opening of the closure all the contents will be discharged from the container and the container rendered unfit for further use. More particularly stated, I preferably provide a container in which the closure to be opened forms the whole or part of the bottom of the container, and is non-replaceable for practical purposes after it has been opened, and so that the container cannot be supported in in any way except by resting the bottom on a suitable support with the result that when the bottom is once opened the contents of the container cannot be replaced or left therein. In another form I provide a container of pyramidal shape in which two of the sides are polygonal in shape and converge to form an apex and the other sides are triangular in shape and converge toward each other to meet the apex formed by the other two sides and the removable closure is secured to the bottom of this container.

This provides a container which cannot be set up on its apex and while it may rest on its sides the removal of the closure prevents any appreciable amount of material from being held in the container because of its sloping side walls, in fact it would be impractical to keep any material in a container of this kind when the bottom was removed.

The invention is further designed to provide a container in which the bottom closure is of such a construction as to be readily removable by pressing inwardly on the central portion thereof.

The invention further consists in the several features hereinafter set forth and more particularly defined by claim at the conclusion hereof.

In the drawings:

Figure 1 is a central sectional view of one form of container embodying the invention;

Fig. 2 is a bottom view thereof;

Fig. 3 is a detail view of the device shown in Fig. 1, showing the bottom disengaged from the sides of the container and ready for removal;

Fig. 4 is a view of a different form of container embodying the invention, parts being broken away and parts being shown in section;

Fig. 5 is a bottom view of the device shown in Fig. 4;

Fig. 6 is a section taken on line 6—6 of Fig. 4.

The container shown in Figs. 1 to 3 inclusive consists of a conical or substantially conical shell 7, a non-replaceable closure or bottom 8, means for securing the bottom to the shell and means for removing the bottom from the shell.

The means for securing the bottom to the shell comprises an inwardly extending annular flange 9 at the bottom of the shell, preferably extending upwardly into the interior of the container and coöperating with a downwardly extending peripheral flange 10 on the bottom plate 8, which interlocks with the flange 9 and the sides of the shell. The shell may be made of glass, metal, paper or fiber board, but the bottom is made of flexible metal, fiber board or paper for reasons hereinafter set forth. When the bottom is made of tin the container may be sealed up after it is filled by applying any suitable sealing preparation to the joining edges of the shell and bottom and when paper is used for the bottom, it may be covered with a coating of wax which may be heated to efficiently seal the parts of the container.

The means for removing the bottom from the shell comprises a downwardly extending contractible portion 11 formed in the flexible bottom 8 and preferably arranged centrally thereof so that when the operator presses inwardly against the side 12 of said portions the flange 10 which is made short for the purpose will straighten out, as shown in Fig. 3 and be disengaged from the flange 9 to permit the ready removal of the bottom by pulling it outwardly from the container. Sufficient force of course may be exerted on the sides of the contractible knob 11 so as to break the seal during the removal of the bottom. It will be noted that this means for removing the bottom or closure of the container obviates the use of any special tools for that purpose as it may be readily opened by hand.

In the construction shown and described above, it will be noted that the shape of the shell is such as to prevent its resting for practical purposes on any side but its bottom so that when the bottom is removed all of the contents of the container will be discharged therefrom and as the bottom is practically non-replaceable the container cannot be used again. The container cannot practically be supported on the apex of the cone or on the side thereof, but must necessarily stand upright.

The container shown in Figs. 4 to 6 inclusive consists of a pyramidal shell 13, a non-replaceable closure or bottom 14, means for securing the bottom to the shell and means for removing the bottom or closure from the shell to empty the contents of the container.

The means for securing the bottom to the shell comprises inwardly extending flanges 15 at the bottom of the shell preferably extending upwardly into the interior of the container and coöperating with downwardly extending short peripheral flanges 16 on the bottom 14 which are disposed between the flanges 15 and the sides of the shell. The shell and bottom may be made of the kinds of material previously mentioned in connection with the first form described and the container may be sealed up as previously set forth.

The means for removing the bottom from the shell comprises a downwardly extending contractible knob 17 formed in the flexible bottom and preferably arranged centrally thereof so that when the operator presses inwardly against the sides 18 of the knob an inward pressure will be exerted against the inner sides of the flanges 16 causing them to straighten out in a manner similar to the construction previously described and thus be disengaged from locking engagement with the flanges 15 to permit the ready removal of the bottom by pulling it outwardly from the container.

In this construction also it will be noted that the container is so shaped as to permit it to rest for practical purposes on one side only and as the non-replaceable closure is formed in this side, the removal of the closure prevents a reuse of the container.

While in both constructions above described I have shown the closure as forming the whole bottom, it will be understood that the closure hereindescribed may form a part of the bottom and substantially the same results obtained.

The invention thus exemplifies a simple and efficient sanitary container which is so constructed and arranged as to prevent the reuse thereof.

What I claim as my invention is:

A sanitary container comprising a shell having inwardly extending flanges at the base portion thereof, said shell being pyramidal in shape so that it can stand upright upon the base portion only, a removable flexible bottom having flanges adapted to interlock with the flanges on the shell to form a recess in the bottom of the container, said bottom having a contractible knob disposed within the recess in the bottom of the container whereby the contraction of the knob will release the interlocking connection between the flanges on the shell and bottom to open the container.

In testimony whereof, I affix my signature.

CHARLES O. CHROMASTER.